United States Patent [19]

Paul et al.

[11] Patent Number: 5,250,658
[45] Date of Patent: Oct. 5, 1993

[54] ISOLATION OF POLYCARBONATE WITH CARBON DIOXIDE

[75] Inventors: Hanns-Ingolf Paul; Rolf Treckmann, both of Cologne; Günther Weymans; Jürgen Kirsch, both of Leverkusen; Wolfgang Herrig, Bergisch Gladbach, all of Fed. Rep. of Germany

[73] Assignee: Bayer Aktiengesellschaft, Leverkusen, Fed. Rep. of Germany

[21] Appl. No.: 940,566

[22] Filed: Sep. 4, 1992

[30] Foreign Application Priority Data

Sep. 11, 1991 [DE] Fed. Rep. of Germany ....... 4130105

[51] Int. Cl.$^5$ .................................................. C08G 64/40
[52] U.S. Cl. ................................... 528/490; 528/196; 528/483; 528/491
[58] Field of Search ................. 528/490, 483, 491, 196

[56] References Cited

U.S. PATENT DOCUMENTS

| 4,207,942 | 6/1980 | Cowan et al. ........................... 165/1 |
| 4,634,761 | 1/1987 | Mendiratta et al. ................. 528/500 |
| 4,918,160 | 4/1990 | Kondoh et al. ...................... 528/483 |

FOREIGN PATENT DOCUMENTS

| 184935 | 6/1986 | European Pat. Off. . |
| 0334314 | 9/1989 | European Pat. Off. ............ 528/490 |
| 4117751 | 6/1992 | Fed. Rep. of Germany . |
| 4118230 | 6/1992 | Fed. Rep. of Germany . |

OTHER PUBLICATIONS

Macromolecules, vol. 18, No. 4, 1985, pp. 674–680, American Chemical Society; M. A. McHugh et al. "Separating polymer solutions with supercritical fluids".

*Primary Examiner*—Harold D. Anderson
*Attorney, Agent, or Firm*—Joseph C. Gil; Aron Preis

[57] ABSTRACT

According to the invention, a special process for isolating polycarbonate from methylene chloride at temperatures of 30° to 80° C. in the form of a powder with residual solvent contents below 5% by weight is started up as a continuous process by starting up in a two-component nozzle, in which $CO_2$-containing fluid and the polymer solution are continuously combined, with a large excess of $CO_2$ and then allowing the polycarbonate/methylene chloride/$CO_2$ fluid system to pass through the gel-forming range of the polycarbonate/methylene chloride/$CO_2$ phase diagram with continuous reduction of the $CO_2$ throughput to a ratio of $CO_2$ to organic solution of 4:1 to 2:1. The process started up in this way has a particularly long useful life.

4 Claims, No Drawings

ISOLATION OF POLYCARBONATE WITH CARBON DIOXIDE

German patent application P 4 118 230.8 (Le A 28 426) describes a process for isolating polymers from their solvents by addition of fluids containing carbon dioxide at temperatures of 30° to 280° C. and under pressures of 1 bar to 1000 bar, characterized in that the concentration of the polymers in their solvents is between 5% by weight and 80% by weight and the fluid containing carbon dioxide consists of at least 50% by weight carbon dioxide.

Compared with other known processes for isolating polymers from their solvents, for example the processes described in U.S. Pat. No. 4,634,761, EP 334 314-A2, DE 3 840 293, JP 01 168 730-A2 and in the Article by Yamamoto Koji et al. in "Kagaku Kogaku Ronbunshu" 15(3), Vol. 1989, pages 673–675, the process described in German patent application P 4 118 230.8 has the advantage that large quantities of solvent are removed quickly and easily with minimal exposure of the product to heat.

According to German patent application P 4 117 751.7 (Le A 28 369), the process described in P 4 118 230.8 can be improved in regard to the powder form by applying a special measure for polycarbonates.

This German patent application describes a continuous process for isolating polycarbonates from methylene chloride at temperatures of 30 to 80° C. in the form of powders with residual solvent contents below 5% by weight, characterized in that a) starting out from a solution of polycarbonate in methylene chloride containing 10 to 40% by weight polycarbonate, based on the total weight of the polycarbonate solution, b) fluid containing carbon dioxide is first mixed in so the polycarbonate/methylene chloride/carbon dioxide system does not gel, typically under pressures of 10 to 50 bar and at temperatures of 30° to 50° C., c) the solution under pressure containing polycarbonate, methylene chloride and fluid containing carbon dioxide is combined in a two-component nozzle with more fluid containing carbon dioxide under a pressure of 50 to 300 bar and preferably under a pressure of 70 to 200 bar at temperatures of 40° to 80° C. and more preferably at 45° to 60° C., d) a residence time of at least 0.1 seconds being established between steps b) and c) and e) the introduction of fluid containing carbon dioxide generally being in such a way that polycarbonate neither gels nor precipitates in step b) and the polycarbonate/methylene chloride/carbon dioxide system is above the gel-forming range in step c) and polycarbonate rapidly precipitates from the three-phase system in the form of solid particles, f) methylene chloride and carbon dioxide gases optionally being substantially separated in a compressor/condenser system and carbon dioxide being returned to the isolation process.

The present invention relates to a special method of starting up the process applicable to the two patent applications cited above. It is precisely in precipitation processes that it is very important to avoid blockages in the apparatus used through uncontrolled precipitation at the beginning of the production process. The present invention optimizes the startup phase in the isolation of polycarbonate from methylene chloride by isolation with $CO_2$.

It has been found that the useful life of the isolation process can be improved if the process is started up in a two-component nozzle, in which $CO_2$-containing fluid and the polymer solution are continuously combined, with a large excess of $CO_2$ and the polycarbonate/methylene chloride/$CO_2$ fluid system subsequently passes through the gel-forming range of the polycarbonate/methylene chloride/$CO_2$ fluid phase diagram with continuous reduction of the $CO_2$ throughput to a ratio of $CO_2$ fluid to inorganic solution of 4:1 to 2:1.

The present invention relates to a process for isolating polycarbonates from methylene chloride by precipitation in fluid containing carbon dioxide, in which a) starting out from a solution of polycarbonate in methylene chloride containing 10 to 40% by weight polycarbonate, based on the total weight of the polycarbonate solution, b) fluid containing carbon dioxide is optionally first mixed in so that the polycarbonate/methylene chloride/carbon dioxide system does not gel, typically under pressures of 10 to 50 bar and at temperatures of 30° to 50° C., c) the solution containing polycarbonate, methylene chloride and optionally fluid containing carbon dioxide is then combined in a two-component nozzle with fluid containing carbon dioxide under a pressure of 50 to 300 bar and preferably under a pressure of 70 to 200 bar at temperatures of 40° to 80° C. and preferably at temperatures of 45° to 60° C., d) a residence time of at least 0.1 second being established between steps b) and c) and e) the introduction of fluid containing carbon dioxide generally being controlled in such a way that polycarbonate neither gels nor precipitates in step b) and the polycarbonate/methylene chloride/carbon dioxide system is above the gel-forming range in step c) and polycarbonate rapidly precipitates from the three-phase system in the form of solid particles, characterized in that the process is improved in regard to its useful life by the following measures:

f) startup with a large excess of $CO_2$ of at least 7 to 15 parts by weight fluid containing carbon dioxide per part by weight polymer solution and g) reduction of the $CO_2$ excess in 1 to 5 minutes to excesses of 4:1 to 2:1 per part by weight polycarbonate solution, h) the polycarbonate/methylene chloride/$CO_2$ fluid system passing through the gel-forming range of the polycarbonate/methylene chloride/$CO_2$ fluid phase diagram in the meantime.

Suitable fluids containing carbon dioxide are fluids containing at least 50% by weight and preferably at least 80% by weight, based on the total weight of the fluid, of pure carbon dioxide.

Suitable polycarbonates are any thermoplastic and aliphatic polycarbonates having molecular weights, solution viscosities, distributions and uniformities in known ranges. The only important requirement is that the polycarbonates to be used should be soluble in methylene chloride at the temperatures used. Preferred polycarbonates are aromatic polycarbonates based on diphenols of the type described, for example, in U.S. Pat. Nos. 3,028,365, 2,999,835, 3,148,172, 3,275,601, 2,991,273, 3,271,367, 3,962,781, 2,970,131 and 2,999,846, in DE-OSS 1 570 703, 2 063 050, 2 063 052, 2 110 956. Particularly preferred polycarbonates are those containing at least 5 mol %, based on the total quantity of diphenols used (=100 mol %), of such diphenols as 4,4'-dihydroxydiphenyl, 2,2-bis-(4-hydroxyphenyl)-propane and 2,2-bis-(3,5-dimethyl-4-hydroxyphenyl)-propane. The polycarbonates may be copolymers or homopolymers; mixtures may also be used. The copolymers may be block or statistical copolymers and may even be branched.

The polycarbonates generally have molecular weights of 15,000 g/mol to 200,00 g/mol (weight averages as determined by gel permeation chromatography). Preferred molecular weights are in the range from 18,000 g/mol to 45,000 g/mol.

Other components which, together with the carbon dioxide, may form the fluid containing carbon dioxide may be any other components which damage neither the polycarbonate nor the methylene chloride. Components which act as stabilizers against outside influences (UV, weathering, etc.) in the polycarbonate may even be used for this purpose.

Two-component nozzles are used for mixing. The two-component nozzles used are preferably those which thoroughly mix the low-viscosity fluid containing carbon dioxide with the relatively high viscosity methylene chloride/fluid/polycarbonate system and which offer a residence time under good mixing conditions in the nozzle of at least 1/30th of a second.

The polycarbonate precipitated is expanded in a vessel together with the methylene chloride and the fluid containing carbon dioxide. The arrangement of the nozzle and the expansion vessel may advantageously be selected in such a way that, before it is deposited in the expansion vessel, the powder flies for at least 1/10th of a second. The powder may then be further processed to granules and may even be compacted.

When the process is started up, the fluid is used in an excess of 7 to 15 parts by weight per part by weight polycarbonate/methylene chloride solution and preferably in an excess of 7 to 10 parts by weight and, more preferably, 8 to 10 parts by weight. In the first few minutes of the startup phase, the $CO_2$ fluid used may even be contaminated to a relatively high degree (for example the fluid only contains 50 to 60% by weight, based on total fluid weight, of pure carbon dioxide while the other components consist for example of other inert gases or may be impurities inherent in the process. In general, the quantity of fluid is continuously reduced after 3 to 10 minutes to excesses of 2 to 4 parts by weight fluid per part by weight polymer solution over a period of 1 to 10 minutes. It can be of advantage in this regard continuously to increase the pressure from 60–150 bar to 80–200 bar and the temperature at which the fluid is introduced from 70° to 100° C. to values of 90° to 130° C.

The fluid is returned to the process via a condenser/compressor system.

EXAMPLES

General Procedure for the Examples 700 g polycarbonate based on 2,2-bis-(4-hydroxyphenyl)-propane (=bisphenol A) (Makrolon 2805), relative viscosity 1.28 (measured for 5 g polymer to 1000 g methylene chloride at 25° C.) are dissolved in 4300 g methylene chloride. The polymer solution is accommodated in a 50 liter autoclave at 50° C. into which carbon dioxide is optionally introduced with intensive stirring until a predetermined system pressure has been established. The solution is then combined with more carbon dioxide in a conical mixing nozzle comprising a spinner and two inlets for more carbon dioxide and the polymer solution. The rate at which the polymer solution and the carbon dioxide are introduced into the nozzle is adjusted. Behind the nozzle there is a 100 liter expansion vessel which the precipitating polycarbonate enters under turbulent conditions together with the methylene chloride and the carbon dioxide. At the startup of the process, the following process parameters are varied:

system pressure in the storage tank
inflow volume of polymer solution per unit of time
inflow volume of carbon dioxide per unit of time In all the tests, a $CO_2$ pressure before the nozzle of 70 bar for a $CO_2$ temperature of 100° C. was built up in the interests of better comparability. The polycarbonate solution was a 14% solution and had a temperature of 25° C. The temperature prevailing in the expansion vessel was 60° C.

The startup behavior of the isolation process was visually evaluated (tendency of the nozzle towards blockage).

The following Table shows the individual results obtained. The initial inflow volume was continuously reduced to the final inflow volume over a period of 3 minutes.

TABLE

| No. | System pressure storage tank | Inflow volume PC solution beginning | Inflow volume $CO_2$ fluid beginning | Inflow volume PC solution after 3 mins. | Inflow volume $CO_2$ fluid after 3 mins. | Result after 1 h |
|---|---|---|---|---|---|---|
| 1 | Normal pressure | 28 ml/min. | 400 g/min. | 28 ml/min. | 80 g/min. | No disturbance |
| 2 | 20 bar | 28 ml/min. | 500 g/min. | 28 ml/min. | 83 g/min. | No disturbance |
| 3 | Normal pressure | 28 ml/min. | 300 g/min. | 25 ml/min. | 70 g/min. | No disturbance |
| Comparison tests: | | | | | | |
| 1 | Normal pressure | 28 ml/min. | 80 g/min. | 28 ml/min. | 80 g/min. | Blockage of nozzle entrance |
| 2 | 20 bar | 28 ml/min | 100 g/min. | 28 ml/min. | 70 g/min. | Uneven expansion process |

We claim:

1. A process for isolating polycarbonate from methylene chloride by precipitation in fluid containing carbon dioxide comprising
   a) forming a solution of polycarbonate in methylene chloride containing 10 to 40% by weight polycarbonate, based on the total weight of the polycarbonate solution,
   c) combining said solution with fluid containing carbon dioxide in a two-component nozzle under a pressure of 50 to 300 bar and at a temperature of 40° to 80° C., to cause rapid precipitation of polycarbonate in the form of solid particles, said combining being controlled in such a way that polycarbonate does not gel.

wherein the process is improved by the following measures:

f) adding a large excess of $CO_2$ of at least 7 to 15 parts by weight fluid containing carbon dioxide per part by weight of polymer solution and g) reducing the $CO_2$ excess in 1 to 5 minutes to excesses of 4:1 to 2:1 per part by weight polycarbonate solution, and h) avoiding the gel-forming range of the polycarbonate/methylene chloride/$CO_2$ fluid system.

2. The process of claim 1 wherein before said c) there is included step b) which consists of adding to said solution a fluid containing carbon dioxide under pressure of 10 to 50 bars and a temperature of 30° to 50° C., to produce a non-gelled polycarbonate/methylene chloride/carbon dioxide system from which polycarbonate does not precipitate, a residence time between said step b) and said c) being at least 0.1 second.

3. The process of claim 1 wherein said pressure is about 70 to 200 bar.

4. The process of claim 1 wherein said temperature is about 45° to 60° C.

* * * * *